US012311655B2

(12) United States Patent
Yoshida et al.

(10) Patent No.: US 12,311,655 B2
(45) Date of Patent: May 27, 2025

(54) INK JET RECORDING APPARATUS HAVING AN INERT GAS SUPPLY PORTION

(71) Applicant: SEIKO EPSON CORPORATION, Tokyo (JP)

(72) Inventors: Yoshinobu Yoshida, Shiojiri (JP); Toshiyuki Yoda, Matsumoto (JP); Kiyoshi Nakamura, Matsumoto (JP); Shohei Namikoshi, Shiojiri (JP); Takuya Ota, Shiojiri (JP); Keita Hanawa, Matsumoto (JP)

(73) Assignee: SEIKO EPSON CORPORATION (JP)

(*) Notice: Subject to any disclaimer, the term of this patent is extended or adjusted under 35 U.S.C. 154(b) by 148 days.

(21) Appl. No.: 18/306,280

(22) Filed: Apr. 25, 2023

(65) Prior Publication Data

US 2023/0339240 A1 Oct. 26, 2023

(30) Foreign Application Priority Data

Apr. 26, 2022 (JP) ................................ 2022-072183

(51) Int. Cl.
*B41J 11/00* (2006.01)

(52) U.S. Cl.
CPC ............................... *B41J 11/00218* (2021.01)

(58) Field of Classification Search
CPC .... B41J 11/00218; B41J 11/00214; B41J 2/01
See application file for complete search history.

(56) References Cited

U.S. PATENT DOCUMENTS

2014/0055539 A1 2/2014 Hayata
2019/0375215 A1* 12/2019 Takahashi ............ B41J 11/0022

FOREIGN PATENT DOCUMENTS

JP 2014-043010 A 3/2014

* cited by examiner

*Primary Examiner* — Bradley W Thies
(74) *Attorney, Agent, or Firm* — Harness, Dickey & Pierce, P.L.C.

(57) ABSTRACT

An ink jet recording apparatus including an ink jet head for ejecting and attaching a radiation-curable ink jet composition to a recording medium, an inert gas supply portion for supplying an inert gas to the recording medium to which the radiation-curable ink jet composition is attached, and an irradiation portion for applying radiation to the radiation-curable ink jet composition attached to the recording medium under supply of an inert gas, wherein the inert gas supply portion slantingly ejects the inert gas toward just under the irradiation portion.

7 Claims, 4 Drawing Sheets

INK JET RECORDING APPARATUS HAVING AN INERT GAS SUPPLY PORTION

The present application is based on, and claims priority from JP Application Serial Number 2022-072183, filed Apr. 26, 2022, the disclosure of which is hereby incorporated by reference herein in its entirety.

BACKGROUND

1. Technical Field

The present disclosure relates to an ink jet recording apparatus.

2. Related Art

Ink jet recording methods have been rapidly developed in various fields since a high-definition image can be recorded by using a relatively simple apparatus. In this regard, various types of research have been performed on, for example, a method for curing a radiation-curable ink. For example, JP-A-2014-043010 discloses an ink jet recording method including a step of efficiently curing an ink jet ink by applying an active ray in a low-oxygen atmosphere.

JP-A-2014-043010 discloses an LED light source unit surrounded by an inert gas blanket having an oxygen-poor atmosphere. However, when such a blanket is used to reduce hindrance to curing due to oxygen, a recording apparatus has to be increased in size.

SUMMARY

According to an aspect of the present disclosure, an ink jet recording apparatus includes an ink jet head for ejecting and attaching a radiation-curable ink jet composition to a recording medium, an inert gas supply portion for supplying an inert gas to the recording medium to which the radiation-curable ink jet composition is attached, and an irradiation portion for applying radiation to the radiation-curable ink jet composition attached to the recording medium under supply of an inert gas, wherein the inert gas supply portion slantingly ejects the inert gas toward just under the irradiation portion.

DESCRIPTION OF EXEMPLARY EMBODIMENTS

Figure 1A:
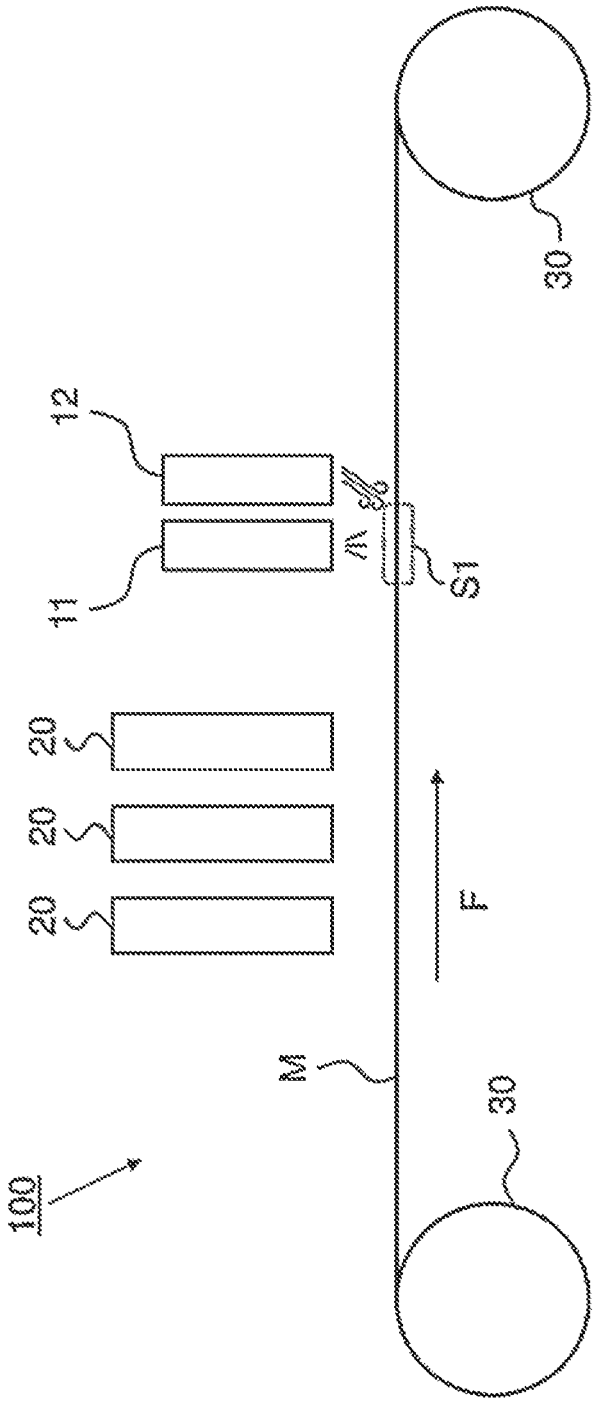
FIG. 1A is a schematic diagram illustrating an aspect of an ink jet recording apparatus according to the present embodiment.

The embodiment according to the present disclosure (hereafter referred to as "the present embodiment") will be described below in detail with reference to the drawings, as the situation demands. However, the present disclosure is not limited to this and can be variously modified within the bounds of not departing from the scope of the disclosure. In this regard, in the drawings, the same elements are indicated by the same references and duplicate explanations may be omitted. The positional relationship in the vertical direction, the horizontal direction, or the like is in accord with the positional relationship illustrated in the drawings, unless otherwise specified. Further, the actual dimensional ratios are not limited to the ratios illustrated in the drawings.

1. Ink Jet Recording Apparatus

An ink jet recording apparatus according to the present embodiment includes an ink jet head for ejecting and attaching a radiation-curable ink jet composition (hereafter also referred to as simply "ink composition") to a recording medium, an inert gas supply portion for supplying an inert gas to the recording medium to which the radiation-curable ink jet composition is attached, and an irradiation portion for applying radiation to the radiation-curable ink jet composition attached to the recording medium under supply of an inert gas, wherein the inert gas supply portion slantingly ejects the inert gas toward just under the irradiation portion.

Regarding a recording apparatus in the related art, since there is a relatively large space between a recording medium and a UV irradiation portion, when an ink composition ejected onto the recording medium is cured, polymerization is susceptible to being hindered due to oxygen. From the viewpoint of suppressing polymerization from being hindered, it is considered that curing is to be performed under low-oxygen-concentration circumstances by performing UV irradiation in a portion surrounded by a blanket or the like and filled with an inert gas. However, when surrounded by a blanket, there is a concern that apparatus size may be increased. On the other hand, when not providing a surrounding blanket, since the efficiency of oxygen concentration reduction by the inert gas is poor due to the large space of the UV irradiation portion, hindrance to polymerization is not readily suppressed from occurring. In particular, when printing speed is increased, a sufficient effect of suppressing hindrance due to oxygen is not obtained, and, in addition, a large gas generator is required due to an increase in the amount of the inert gas used.

On the other hand, in the present embodiment, the inert gas supply portion slantingly ejects the inert gas toward just under the irradiation portion. Consequently, even when a surrounding blanket or the like is not provided, since only the vicinity of the recording medium just under the irradiation portion in which the ink composition is cured can take on a low-oxygen-concentration state, an efficiency of oxygen concentration reduction by the inert gas can be improved, and a size reduction of the apparatus can be realized.

Figure 1B:
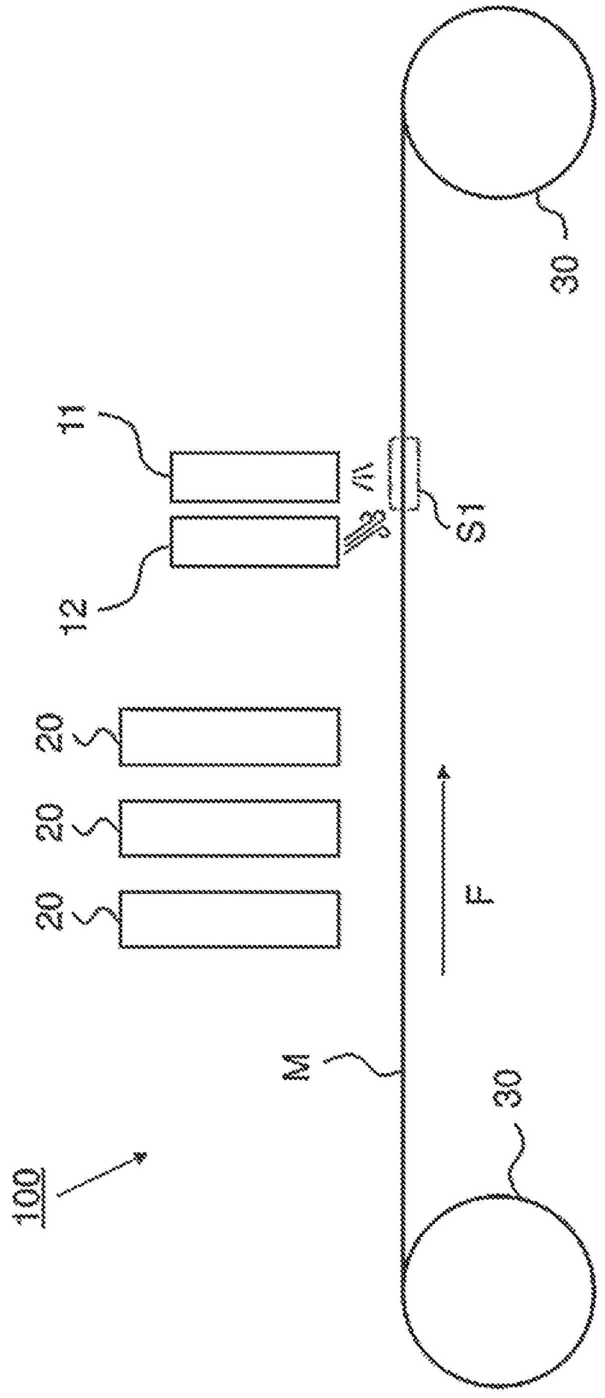
FIG. 1B is a schematic diagram illustrating another aspect of the ink jet recording apparatus according to the present embodiment.
Figure 1C:
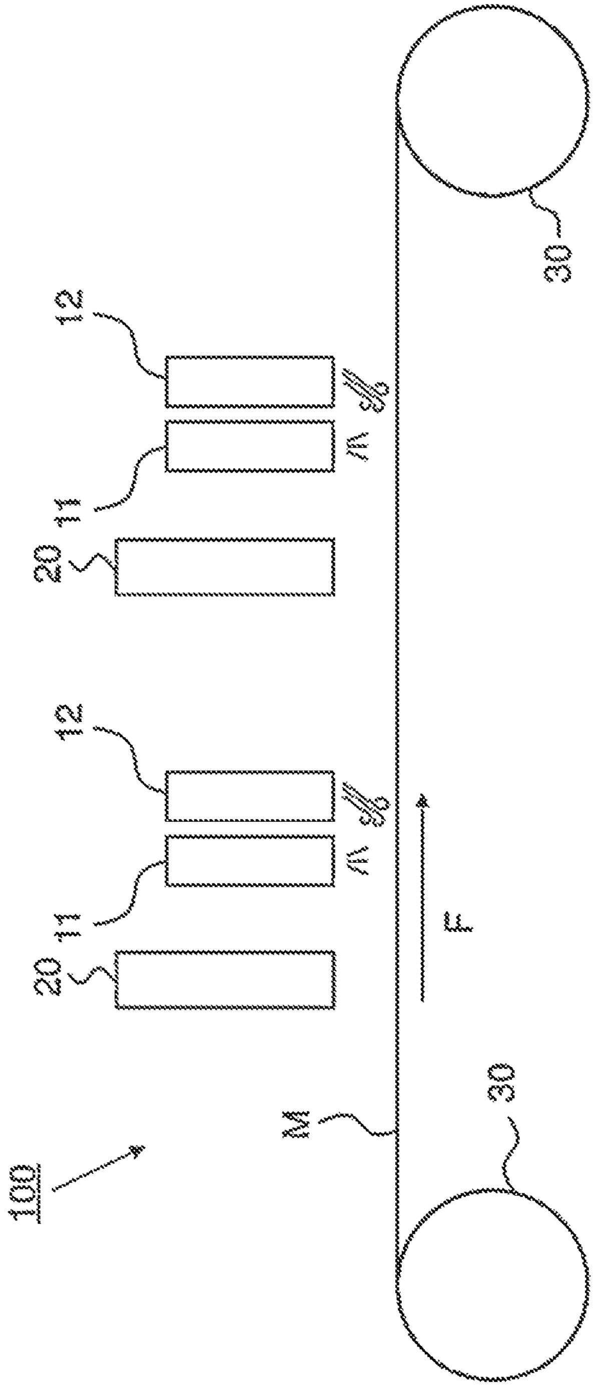
FIG. 1C is a schematic diagram illustrating another aspect of the ink jet recording apparatus according to the present embodiment.

FIG. 1A to FIG. 1C are schematic diagrams illustrating the ink jet recording apparatuses according to the present embodiment. As illustrated in FIG. 1A to FIG. 1C, the ink jet recording apparatus 100 includes an irradiation portion 11, an inert gas supply portion 12, ink jet heads 20, and transport portions 30. Configurations of these will be described below in detail.

1.1. Ink Jet Head

The ink jet head 20 is a device for ejecting and attaching an ink composition to a recording medium M. The ink jet head 20 has nozzles in a nozzle plate surface opposite the recording medium M, and the ink composition is ejected from the nozzles. The nozzles may be arranged in a line.

The recording apparatus 100 according to the present embodiment may include the ink jet heads 20 independent of each other in accordance with a color such as cyan, magenta, yellow, black, or white. Alternatively, an ink jet head 20 may be configured to eject two or more colors of ink compositions.

Regarding the system for ejecting the ink composition from a nozzle, there is a method in which a pressure generation device is operated so as to eject the composition introduced into a pressure generation chamber of the ink jet head from the nozzle. Such an ejection method is also referred to as an ink jet method. There is no particular limitation regarding a method for pressurizing the ink composition in the nozzle, and examples include a piezoelectric method in which a liquid droplet of the ink composition is ejected by using a piezoelectric element and a thermal system in which a liquid droplet is ejected by heating.

Regarding the ink jet head 20 used in an ejection step, there are a line head for performing recording based on a line system and a serial head for performing recording based on a serial system. Of these, the line head is favorable. Consequently, printing speed can be improved.

In the line system including a line head, for example, an ink jet head having a width larger than or equal to a width of a recording medium is fixed to a recording apparatus. Subsequently, the recording medium is moved in a sub-scanning direction (transport direction) and an ink droplet is ejected from a nozzle of the ink jet head operatively associated with the movement so that an image is recorded on the recording medium.

In the serial system including a serial head, for example, an ink jet head is mounted on a carriage movable in a width direction of the recording medium. Subsequently, the carriage is moved in a main scanning direction (width direction) and an ink droplet is ejected from a nozzle opening of the head operatively associated with the movement so that an image can be recorded on the recording medium.

Of these, from the viewpoint of enabling a large amount of printing to be performed at a high speed, the line system is favorably used. Regarding the line system, recording and application of radiation can be successively performed by using a line head in a single pass while the recording medium is continuously sent in the sub-scanning direction. In particular, when the recording medium has a long shape in the transport direction, the recording medium to which the ink is attached can readily configured to be taken up downstream in the transport direction. In this regard, the form of the recording apparatus illustrated in FIG. 1A to FIG. 1C are examples of the line system.

1.2. Irradiation Portion

The irradiation portion 11 applies radiation to the ink composition attached to the recording medium under supply of an inert gas. When the radiation is applied, a polymerization reaction of a monomer in the ink composition is initiated, and the composition is cured so as to form a coating film. In such an instance, a polymerization initiator that is present generates an active species (initiation species) such as a radical, an acid, or a base, and the polymerization reaction of the monomer is facilitated due to the function of the initiation species.

Herein, examples of the radiation include ultraviolet rays, infrared rays, visible rays, and X-rays. The irradiation portion 11 may be disposed downstream of the ink jet head 20. Consequently, the radiation can be applied to the ink composition attached to the recording medium. There is no particular limitation regarding the irradiation portion 11, and the irradiation portion 11 is, for example, a UV-LED. Using such a radiation source enables a size reduction of the apparatus and a cost reduction to be realized.

In the line system including a line head, it is preferable that the irradiation portion 11 also has a width larger than or equal to a width of the recording medium. Consequently, recording and application of radiation can be successively performed in a single pass, and the recording medium to which the ink is attached can be taken up downstream.

1.3. Inert Gas Supply Portion

The inert gas supply portion 12 is a device for supplying an inert gas to the recording medium to which the ink composition is attached and slantingly ejects the inert gas toward just under the irradiation portion 11. As described above, when the radiation is applied from the irradiation portion 11, a polymerization reaction of a monomer in the ink composition is initiated, and the composition is cured so as to form a coating film. In such an instance, the radiation being applied in an atmosphere in which oxygen is present such as in air may cause, for example, deactivation of the polymerization initiator due to oxygen and termination of the polymerization reaction due to a reaction between an end of a growing polymer and oxygen.

Therefore, in the present embodiment, a space having a low oxygen concentration is formed just under the irradiation portion 11 and in the vicinity of a surface Si to which the ink composition is attached by the inert gas supply portion 12 ejecting the inert gas toward just under the irradiation portion 11. In this regard, the radiation being applied from the irradiation portion 11 toward the space enables deactivation of the polymerization initiator and termination of the polymerization reaction to be suppressed from occurring.

The recording apparatus 100 may include the irradiation portion 11 and the inert gas supply portion 12 successively in the transport direction of the recording medium or may include the inert gas supply portion 12 and the irradiation portion 11 successively in the transport direction of the recording medium.

As illustrated in FIG. 1A, when the irradiation portion 11 and the inert gas supply portion 12 are included successively in the transport direction of the recording medium, the inert gas supply portion 12 is configured to slantingly eject the inert gas toward the upstream of the recording medium in the transport direction. When the inert gas is ejected toward the upstream of the recording medium in the transport direction, as described above, the ejection direction of the inert gas is the direction opposite to the transport direction of the recording medium. Consequently, the ejected inert gas collides with the transported recording medium and tends to be retained just under the irradiation portion. As a result, hindrance to curing due to oxygen is further suppressed from occurring, and an amount of the inert gas ejected can be relatively reduced.

Alternatively, as illustrated in FIG. 1B, when the inert gas supply portion 12 and the irradiation portion 11 are included successively in the transport direction of the recording medium, the inert gas supply portion 12 is configured to slantingly eject the inert gas toward the downstream of the recording medium in the transport direction. When the inert gas is ejected toward the downstream of the recording medium in the transport direction, as described above, the ejection direction of the inert gas is the same direction as the transport direction of the recording medium. Consequently, the ejected inert gas is readily introduced to just under the irradiation portion along the flow of the transported recording medium. As a result, hindrance to curing due to oxygen tends to be further suppressed from occurring.

As described above, a space having a low oxygen concentration can be formed in the vicinity of the surface Si to which the ink composition is attached by the inert gas being ejected toward just under the irradiation portion. Consequently, even when a surrounding blanket or the like is not provided, the efficiency of oxygen concentration reduction by the inert gas can be improved.

Figure 2A:
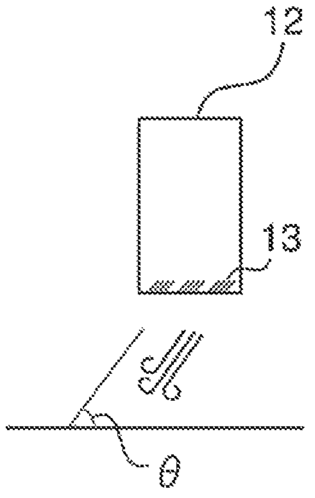
FIG. 2A is a schematic diagram illustrating an aspect of an inert gas ejection portion.
Figure 2B:
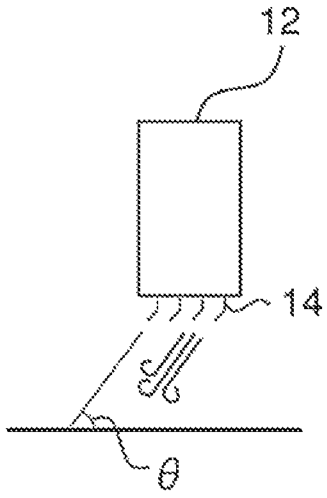
FIG. 2B is a schematic diagram illustrating another aspect of the inert gas ejection portion.

As illustrated in FIG. 2A, the inert gas supply portion 12 may include a nozzle 13 having a predetermined inclination θ as an ejection outlet of the inert gas. In this regard, as illustrated in FIG. 2B, the inert gas supply portion 12 may include a guide 14 having a predetermined inclination θ as a guide for controlling a supply direction of the ejected inert gas. The guide 14 may be a plate-like member.

The inert gas supply portion 12 slantingly ejects the inert gas toward just under the irradiation portion 11. In this regard, "slantingly eject" denotes that ejection is performed while the angle θ formed by the supply direction of the inert gas and the surface of the recording medium is not set to be 90°. The angle θ formed by the supply direction of the inert gas supplied from the inert gas supply portion 12 and the surface of the recording medium is preferably 10° to 85°, more preferably 20° to 75°, and further preferably 30° to 65°. The angle θ being the above-described range facilitates supply of the inert gas to just under the irradiation portion 11 so that the efficiency of oxygen concentration reduction tends to be further improved.

In addition, the inert gas being supplied to just under the irradiation portion, as in the present embodiment, enables the region to which the inert gas is applied to be reduced compared with a method in the related art. In this regard, specifically, the amount of the inert gas supplied is preferably 0.8 L/min/cm or more and 4.0 L/min/cm or less and more preferably 1.0 L/min/cm or more and 3.5 L/min/cm or less. The amount of the inert gas supplied being within the above-described range tends to further improve the efficiency of oxygen concentration reduction even when the amount of the inert gas supplied is relatively small.

In the line system including a line head, it is preferable that the inert gas supply portion 12 also has a width larger than or equal to the width of the recording medium. Consequently, recording and application of the radiation can be successively performed in a single pass, and the recording medium to which the ink is attached can be taken up downstream.

FIG. 1C is a schematic diagram illustrating another aspect of the ink jet recording apparatus 100 according to the present embodiment. As illustrated in FIG. 1C, the recording apparatus 100 according to the present embodiment may include a plurality of ink jet heads 20, and the irradiation portions 11 and the inert gas supply portions 12 may be included in one-to-one correspondence with the ink jet heads 20.

More specifically, the recording apparatus 100 according to the present embodiment may include the ink jet heads 20 independent of each other in accordance with a color such as cyan, magenta, yellow, black, or white and may include a set of the irradiation portion 11 and the inert gas supply portion 12 in one-to-one correspondence with the ink jet head 20. Consequently, the image quality of the recorded material tends to be still further improved.

In particular, as described above, the irradiation portion 11 and the inert gas supply portion 12 according to the present embodiment can improve the efficiency of oxygen concentration reduction by the inert gas and can improve the efficiency of curing by application of the radiation in the space between the irradiation portion 11 and the surface of the recording medium M without including the blanket or the like. Consequently, since the irradiation portion 11 and the inert gas supply portion 12 can be reduced in size, a set of the irradiation portion 11 and the inert gas supply portion 12 can be disposed in one-to-one correspondence with the ink jet head 20.

On the other hand, regarding a recording apparatus including a blanket or the like in the related art, in consideration of practical limitation of the apparatus size, it is appropriate to dispose a set of the irradiation portion 11 and the inert gas supply portion 12 for a plurality of ink jet heads 20, and it is substantially difficult to dispose a set of the irradiation portion 11 and the inert gas supply portion 12 in one-to-one correspondence with an ink jet head 20.

1.4 Transport Portion

The recording apparatus 100 according to the present embodiment may include a transport portion 30 for transporting the recording medium M. There is no particular limitation regarding the transport portion 30, provided that the transport portion 30 is configured to transport the recording medium M in the transport direction F. For example, in FIG. 1A to FIG. 1C, the transport portion 30 which sends out the roll-like recording medium M and the transport portion 30 which takes up the roll-like recording medium M are illustrated.

1.5 Recording Medium

There is no particular limitation regarding the recording medium used in the recording apparatus 100 according to the present embodiment, and, for example, a nonabsorbent recording medium is favorable. In particular, regarding the recording medium used in the present embodiment, it is preferable that both the recording surface and the non-recording surface be nonabsorbent. Using such a recording medium enables a recorded material suitable for a label use and the like to be obtained.

There is no particular limitation regarding the nonabsorbent recording medium, and examples include plastic films and plates formed of polyvinylchlorides, polyethylenes, polypropylenes, polyethylene terephthalates (PETs), polycarbonates, polystyrenes, polyurethanes, and the like; metal plates formed of iron, silver, copper, aluminum, and the like; metal plates or plastic films and alloy plates such as stainless steel and brass, produced by vapor-depositing these metals; and recording media in which a plastic film of a polyvinylchloride, a polyethylene, a polypropylene, a polyethylene terephthalate (PET), a polycarbonate, a polystyrene, a polyurethane, or the like is bonded (coating) to paper base materials.

In this regard, in the present embodiment, the nonabsorbency refers to an amount of water absorbed in 30 msec from the start of contact being 10 mL/$m^2$ or less in accordance with the Bristow method. The nonabsorbent recording medium is a recording medium having such nonabsorbency. The Bristow method is the most widely used method for measuring an amount of a liquid absorbed in a short time and is also adopted by the Japan Technical Association of the Pulp and Paper Industry (JAPAN TAPPI). The test method is described in detail in Standard No. 51 "Paper and Paperboard-Liquid Absorbency Test Method-Bristow Method" of "JAPAN TAPPI Paper and Pulp Test Methods 2000 edition".

2. Recording Method

The recording method according to the present embodiment is a recording method of the above-described ink jet recording apparatus and includes an ejection step of ejecting and attaching the ink composition to the recording medium and an irradiation step of applying radiation to the ink composition attached to the recording medium so as to obtain a cured coating film of the ink composition. In the irradiation step, radiation is applied to the recording medium to which the ink composition is attached, while an inert gas is supplied toward just under the irradiation portion.

2.1. Ejection Step

The ejection step is a step of ejecting the ink composition from the ink jet head 20 and attaching the ink composition to the recording medium M. More specifically, a pressure generation device is operated so as to eject the composition introduced into a pressure generation chamber of the ink jet head from the nozzle.

From the viewpoint of taking up the recording medium to which the ink is attached, it is preferable that the line system be used in the ejection step. Regarding the line system, the recording medium is continuously sent in the sub-scanning direction, recording and application of radiation are successively performed by using a line head, and the recording medium to which the ink is attached is taken up downstream. In this regard, the form of the recording apparatus illustrated in FIG. 1A to FIG. 1C is the line system.

There is no particular limitation regarding the mode of attachment such as ink duty in the ejection step, and the mode can be appropriately adjusted in accordance with an objective image.

2.2. Irradiation Step

The irradiation step is a step of applying radiation from the irradiation portion 11 to the ink attached to the recording medium M, while the inert gas is sent from the inert gas supply portion 12 to just under the irradiation portion 11 so as to obtain a cured coating film of the ink while polymerization is suppressed from being hindered due to oxygen.

In the irradiation step, radiation is applied to the ink composition attached to the recording medium. When the radiation is applied, a polymerization reaction of a monomer is initiated, and the ink composition is cured so as to form a coating film. In such an instance, a polymerization initiator that is present generates an active species (initiation species) such as a radical, an acid, or a base, and the polymerization reaction of the monomer is facilitated due to the function of the initiation species.

The irradiation step is a step of applying radiation to a radiation-curable ink jet composition attached to the recording medium so as to obtain a cured coating film of the radiation-curable ink jet composition. In particular, in the irradiation step of the present embodiment, radiation is applied under supply of an inert gas to the recording medium to which the radiation-curable ink jet composition is attached.

Herein, examples of the radiation include ultraviolet rays, infrared rays, visible rays, and X-rays. The radiation from a radiation source disposed downstream of the ink jet head is applied to the composition.

2.3. Stacking Step

The recording method according to the present embodiment may include a stacking step of stacking the recorded material so that the recording surface to which the ink composition is attached and the non-recording surface to which the ink composition is not attached are opposite each other.

There is no particular limitation regarding the stacking method in the stacking step. For example, cut-sheet-like recorded materials are stacked one on top of another so that the recording surface and the non-recording surface are opposite each other or a recorded material in which recording is continuously performed on a long recording medium is stacked while being taken up into a roll-like shape downstream of the recording apparatus so that the recording surface and the non-recording surface are opposite each other. More specifically, the recorded material can be made into a rolled body by being taken up using a take-up roller. In the resulting rolled body, the recorded material is rolled while being stacked so that the recording surface and the non-recording surface are opposite each other.

3. Ink Composition

In the present embodiment, the radiation-curable ink jet composition is an ink jet composition that is cured by being irradiated with radiation. Examples of the radiation include ultraviolet rays, electron beams, infrared rays, visible rays, and X-rays. Of these, ultraviolet rays are favorable as the radiation from the viewpoint of the radiation source being readily available and in widespread use and also from the viewpoint of the material suitable for curing by application of ultraviolet rays being readily available and in widespread use.

There is no particular limitation regarding the radiation-curable ink jet composition according to the present embodiment, and, for example, a polymerizable compound, a photopolymerization initiator, a polymerization inhibitor, a slip agent, a coloring material, a dispersing agent, and the like may be contained. In this regard, the ink composition may be an ink composition for an undercoat used as a base or the like, an ink composition for forming an image, such as a color ink, or an ink composition for an overcoat.

3.1. Polymerizable Compound

The polymerizable compound contains a monofunctional monomer and, as the situation demands, may contain a polyfunctional monomer.

There is no particular limitation regarding the monofunctional monomer, and examples include monofunctional monomers having an alicyclic group, monofunctional monomers having an aromatic group, and monofunctional monomers having a nitrogen-containing heterocyclic group. In this regard, monomers other than these may be used as the monofunctional monomer.

There is no particular limitation regarding the polyfunctional monomer, and examples include vinyl-containing (meth)acrylates and polyfunctional (meth)acrylates.

3.2. Photopolymerization Initiator

There is no particular limitation regarding the photopolymerization initiator provided that an active species is generated by application of radiation, and examples include known photopolymerization initiators, such as acylphosphine-oxide-based photopolymerization initiators, alkylphenone-based polymerization initiators, titanocene-based polymerization initiators, and thioxanthone-based photopolymerization initiators. Of these, acylphosphine-oxide-based photopolymerization initiators are favorable. Using such a photopolymerization initiator further improves the curability of the ink. In particular, the curability through a curing process due to the light from the UV-LED tends to be further improved. The photopolymerization initiators may be used alone, or at least two types may be used in combination.

3.3. Polymerization Inhibitor

There is no particular limitation regarding the polymerization inhibitor, and examples include p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds. The polymerization inhibitors may be used alone, or at least two types may be used in combination.

3.4. Slip Agent

Regarding the slip agent, silicone-based surfactants are favorable, and polyester-modified silicones or polyether-modified silicones are more favorable. Examples of the polyester-modified silicone include BYK-347, 348, BYK-UV3500, 3510, and 3530 (all produced by BYK Additives & Instruments), and examples of the polyether-modified silicone include BYK-3570 (produced by BYK Additives & Instruments). The slip agents may be used alone, or at least two types may be used in combination.

3.5. Coloring Material

Regarding the coloring material, at least one of a pigment and a dye can be used. In this regard, a dispersing agent may be used in accordance with the type of the coloring material. There is no particular limitation regarding the dispersing agent, and examples include dispersing agents such as polymer dispersing agents commonly used for preparing pigment dispersion liquids. Specific examples include dispersing agents containing at least one of polyoxyalkylenes, polyalkylenes, polyamines, vinyl-based polymers or copolymers, acrylic polymers or copolymers, polyesters, polyamides, polyimides, polyurethanes, amino-based polymers, silicon-containing polymers, sulfur-containing polymers, fluorine-containing polymers, and epoxy resins as a primary component. The dispersing agents may be used alone, or at least two types may be used in combination.

What is claimed is:

1. An ink jet recording apparatus comprising:

an ink jet head for ejecting and attaching a radiation-curable ink jet composition to a recording medium, the recording medium being transported in a transport direction;

an inert gas supply portion for supplying an inert gas to the recording medium to which the radiation-curable ink jet composition is attached; and an irradiation portion for applying radiation to the radiation-curable ink jet composition attached to the recording medium under supply of an inert gas, wherein the inert gas supply portion slantingly ejects the inert gas toward just under the irradiation portion, and the irradiation portion is located further at an upstream side than the inert gas supply portion along the transport direction.

2. The ink jet recording apparatus according to claim 1, wherein the inert gas supply portion slantingly ejects the inert gas toward an upstream of the recording medium in the transport direction.

3. The ink jet recording apparatus according to claim 1, wherein the ink jet head has a width larger than or equal to a width of the recording medium.

4. The ink jet recording apparatus according to claim 1, wherein the inert gas supply portion and the irradiation portion have a respective width larger than or equal to a width of the recording medium.

5. The ink jet recording apparatus according to claim 1, wherein an amount of the inert gas supplied is 0.8 L/min/cm or more and 4.0 L/min/cm or less.

6. The ink jet recording apparatus according to claim 1, wherein an angle formed by a supply direction of the inert gas supplied from the inert gas supply portion and a surface of the recording medium is in a range of 10 degrees to 85 degrees.

7. The ink jet recording apparatus according to claim 1, wherein the inert gas supply portion includes a guide member for controlling a supply direction of the inert gas.

* * * * *